3,277,078
ZYGOMYCIN A₁ AND ZYGOMYCIN A₂ AND THEIR ISOLATION
Satoshi Horii and Hiromu Hitomi, Osaka, and Akira Miyake, Hyogo, Japan, assignors to Takeda Chemical Industries, Ltd., Osaka, Japan
Filed Mar. 23, 1964, Ser. No. 354,039
Claims priority, application Japan, Mar. 23, 1963, 38/15,277, 38/15,278
4 Claims. (Cl. 260—210)

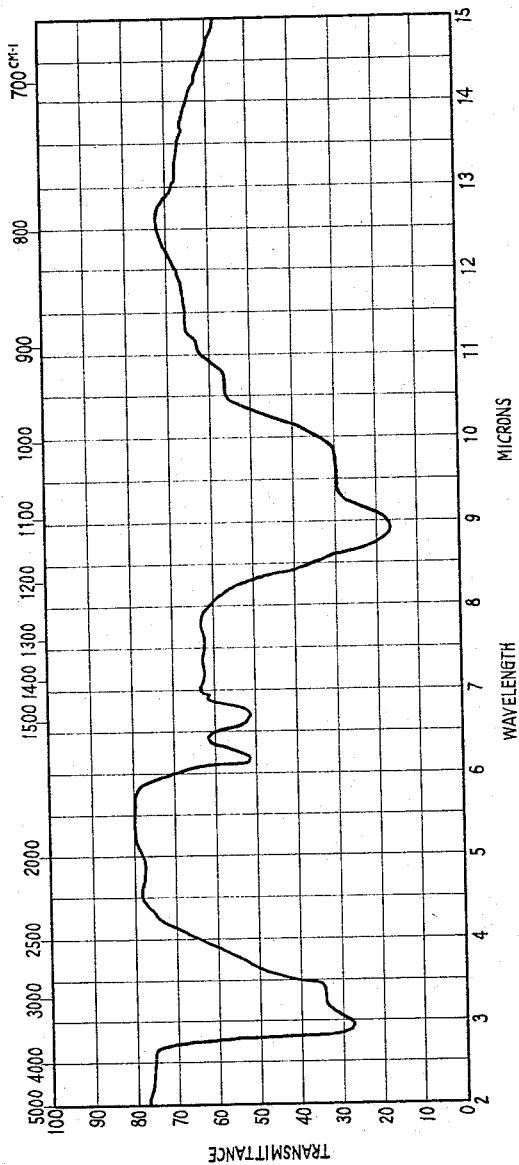

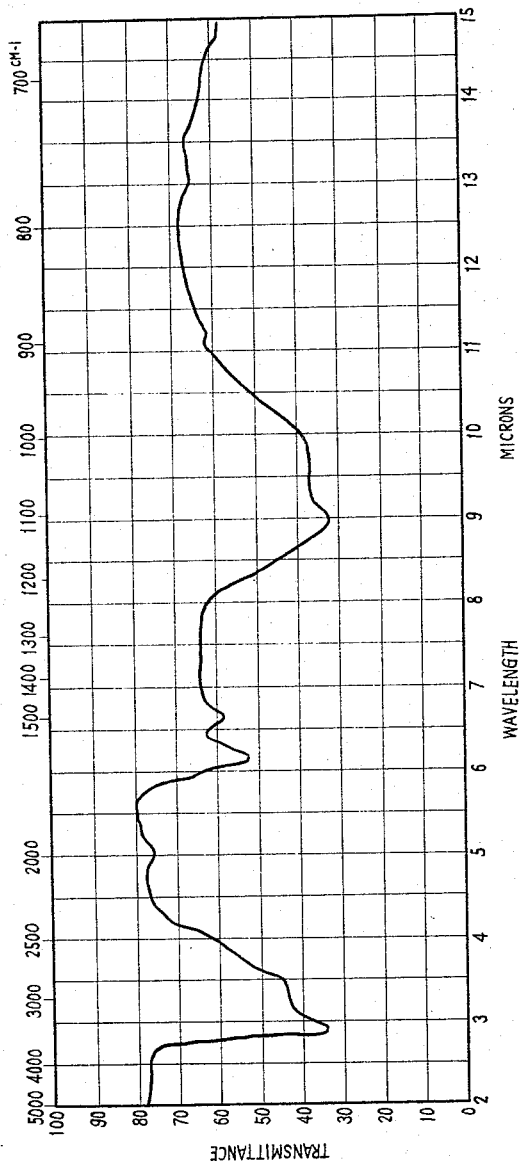

The present invention is concerned with the antibiotics Zygomycin $A_1$ and Zygomycin $A_2$, more especially with the former, and with their recovery in isolated form, more particularly from Zygomycin A, whereby the individual substances Zygomycin $A_1$ and Zygomycin $A_2$ are obtained.

Zygomycin A, a known antibiotic substance, is obtainable from the culture of *Streptomyces pulveraceus* in known manner. While Zygomycin A has been regarded to be a simple substance, it has been possible to separate N-acetyl Zygomycin A, obtained from Zygomycin A by acetylation thereof, into two components by subjecting the N-acetyl derivative to column chromatography on powdered filter paper. However, notwithstanding repeated efforts to separate Zygomycin A into a plurality of components by a direct method, this has never been accomplished so that the initially presumed unitary character of Zygomycin A has never been gainsaid by a direct method of separation. On the other hand, N-acetyl Zygomycin $A_1$ and N-acetyl Zygomycin $A_2$ have no antibiotic activity, and neither can be used therapeutically. Even if deacetylation of N-acetyl Zygomycin $A_1$ or N-acetyl Zygomycin $A_2$—by subjecting them, for example, to hydrolysis—is attempted, neither Zygomycin A nor the postulated Zygomycin $A_1$ or Zygomycin $A_2$ can be obtained, because the glycoside portion rather than the acetyl portion splits off first. Thus, Zygomycin $A_1$ and Zygcomycin $A_2$ have never before been separated from each other.

A primary object of the present invention is the isolation of Zygomycin $A_1$ and Zygomycin $A_2$, whereby Zygomycin $A_1$ will be available free from admixture with Zygomycin $A_2$ and vice-versa. This object has been achieved by the present invention by column chromatography under controlled conditions with the aid of ion-exchange resins with Zygomycin A (free base or salt) as the preferred starting material.

The thus successfully isolated Zygomycin $A_1$ and Zygomycin $A_2$ are found to have similar chemical structures and to form pharmaceutically acceptable acid addition salts with a variety of acids such as hydrochloric acid, sulfuric acid, phosphoric acid, etc. By the method of the present invention, Zygomycin $A_1$ and Zygomycin $A_2$ can be individually obtained, i.e., without admixture with the other, in the free state or in the acid salt form.

Two types of column chromatography employing ion-exchange resins can be employed in realizing the object of this invention, namely, (a) a method employing carboxylic-type cation exchange resin, and (b) a method employing strong base anion exchange resin.

Reference is made first to method (a):

Zygomycin A (base or acid salt) or a mixture containing Zygomycin $A_1$ and Zygomycin $A_2$, irrespective of their being in the free state or in the acid salt form as mentioned above, is dissolved in an aqueous solvent such as, most preferably, water or an aqueous solvent containing a hydrophilic organic solvent, e.g., methanol, ethanol, acetone; then the solution is poured onto a column packed with carboxylic-type cation exchange resin, Zygomycin $A_1$ and Zygomycin $A_2$ being thereby adsorbed on the resin. This aqueous solvent is preferably provided beforehand with a certain amount of cationic ions such as ammonium, sodium or potassium ions. Most suitably, the pH of the solvent is adjusted beforehand to approximately 9 with aqueous ammonia, taking into consideration that Zygomycin $A_1$ and Zygomycin $A_2$ are subsequently fractionally eluted from the resins on which they were adsorbed. The resin is required to be used in a base-form such as the ammonium or sodium form, preferably the former.

As carboxylic acid type-cation exchange resin, there may be employed, for example, Amberlite IRC-50 (Rohm & Haas Co. Inc., Philadelphia, Pennsylvania, U.S.A.), Zeokarb 226 (Permutit Co. Ltd., England), etc. These resins may be prepared by methods described in "Ion Exchange Resin" by Robert Kunin (published by John Wiley & Sons, Inc., New York, N.Y., pp. 82–85), or by methods described in literature references cited in the said text.

As the solvent for fractionally eluting the Zygomycin $A_1$ and Zygomycin $A_2$ from the layer of carboxylic acid-type resin onto which the starting substance or mixture containing Zygomycin $A_1$ and Zygomycin $A_2$ is caused to be adsorbed, there is employed an aqueous solvent containing a suitable concentration of cation. As such aqueous solvent, there may be employed those similar to the afore-mentioned solvents usable for causing the starting substance or mixture of Zygomycin $A_1$ and Zygomycin $A_2$ to be adsorbed onto the resin layer.

The procedure in outline is that (1) Zygomycin A or a mixture containing Zygomycin $A_1$ and Zygomycin $A_2$ is caused to be adsorbed onto ammonia-form resin, (2) the so-adsorbed Zygomycin $A_1$ and Zygomycin $A_2$ are fractionally eluted by suitably changing the concentration of the aqueous ammonia employed as the elution solvent, (3) fractions respectively containing mainly Zygomycin $A_1$ and Zygomycin $A_2$ are collected groupwise, and (4) the so-called collected fractions are respectively concentrated, whereby the objective products are directly and separately obtained, ammonia being eliminated during the concentration process. This is very advantageous as compared with a procedure which e.g. requires an additional process step for eliminating the cation contained in the elution fractions, as when use is made of a solvent containing some other cation than mentioned above. Cation concentration of the elution solvent may be suitably adapted to the kind of cation, kind of resin, elution velocity, elution volume, pH of the elution solution, etc. When, for example, aqueous ammonia is employed, approximately ⅛ N aqueous ammonia is preferably used for the elution of Zygomycin $A_2$ and approximately ⅕ N aqueous ammonia for eluting Zygomycin $A_1$.

The procedure according to method (b) is as follows:
First, Zygomycin A (base or acid salt) or a mixture containing Zygomycin $A_1$ and Zygomycin $A_2$, irrespective of their being in the free state or in the form of their acid salts, is dissolved in an aqueous solvent such as, most preferably, water, or an aqueous solvent containing a hydrophilic organic solvent, e.g., methanol, ethanol or acetone; then the solution is poured onto a column packed with strong base anion exchange resin, Zygomycin $A_1$ and Zygomycin $A_2$ being adsorbed on the resin. As the strong base anion exchange resin, such porous resins are especially suitable wherein the ratio of divinyl benzene contained therein is about 2–3% and wherein there is only a small degree of cross-linking. Those resins which contain divinyl benzene in a high ratio are not suitable, because such resins cause difficulty in the removal of Zygomycin $A_1$ and Zygomycin $A_2$ from the resins.

As suitable strong base anion exchange resin, there is for example employed Dowex 1 x 2 (Dow Chemical Co., Inc., Midland, Michigan, U.S.A.). This type of resin can be prepared by methods described in "Ion Exchange Resin" by Robert Kunin (published by John Wiley & Sons, Inc., New York, N.Y., pp. 87–97), or by methods described in literature references cited in the said text.

As the elution solvent of Zygomycin $A_1$ and Zygomycin $A_2$ thus adsorbed onto the resin, there is employed an aqueous solvent such as, most preferably, water, or an aqueous solvent containing a hydrophilic organic solvent, e.g., methanol, ethanol or acetone.

Any of the aforementioned aqueous solvents can be employed for effecting the gradual elution of Zygomycin $A_1$ and Zygomycin $A_2$, the Zygomycin $A_2$ being first eluted, followed by the elution of Zygomycin $A_1$. The respective elution fractions are collected and concentrated to obtain Zygomycin $A_1$ and Zygomycin $A_2$ in their free states respectively. Thus-obtained Zygomycin $A_1$ and Zygomycin $A_2$ may be converted into their salts with an inorganic or organic acid such as sulfuric acid, hydrochloric acid, phosphoric acid, alkane sulfonic acid or aliphatic acid by a conventional means as known in the case of Zygomycin A.

Thus-obtained Zygomycin $A_1$ is a compound in which pseudoneamine and neobiosamine B are combined, and Zygomycin $A_2$ is a compound in which pseudoneamine and neobiosamine C are combined. Chemical, microbial and pharmacological properties of Zygomycin $A_1$ and Zygomycin $A_2$ are as follows:

Specific rotation of Zygomycin $A_1$ sulfate is $$[\alpha]_D^{24} = +47°$$

($c=1.0$, $H_2O$), while that of Zygomycin $A_2$ sulfate is $[\alpha]_D^{24} = +78°$ ($c=1.0$, $H_2O$), showing a remarkable difference between them. Infrared absorption spectra of Zygomycin $A_1$ sulfate and Zygomycin $A_2$ sulfate are shown in the accompanying FIGS. 1 and 2, respectively, both showing absorptions specific to —OH group at the neighborhood of $3.0\mu$ and —$NH_3$ group at around $6.2\mu$ and $6.6\mu$. Minimum concentrations of Zygomycin $A_1$ and Zygomycin $A_2$ against growth of various pathogenic microorganisms in vitro are shown in the following table:

| Test Microorganisms | Minimum Concentration for Growth Inhibition (γ/ml.) | |
|---|---|---|
| | Zygomycin $A_1$ sulfate | Zygomycin $A_2$ sulfate |
| Escherichia coli | 2.0 | 10 |
| Proteus vulgaris | 10 | 50 |
| Staphylococcus aureus | 3 | 10 |
| Bacillus subtilis | 0.2 | 1.0 |
| Bacillus cereus | 1.0 | 5.0 |
| Sarcina lutea | 10 | 100 |
| Micrococcus flavus | 20 | 100 |
| Mycobacterium avium | 1.0 | 50 |
| Mycobacterium avium (Streptomycin resistant) | 1.0 | 50 |
| Mycobacterium avium (Neomycin resistant) | 200 | 500 |
| Mycobacterium smegmatis | 2.0 | 50 |
| Mycobacterium phlei | 2.0 | 50 |

Acute toxicity of Zygomycin $A_1$ sulfate to mice on intravenous injection is $LD_{50} = 118$ mg./kg., while that of Zygomycin $A_2$ sulfate is $LD_{50} = 174$ mg./kg.

As shown in the above table, antimicrobial activity of Zygomycin $A_1$ is several times or several ten-fold times stronger as compared with Zygomycin A itself or Zygomycin $A_2$, and moreover Zygomycin $A_1$ shows an effect against microorganisms resistant to various pharmaceuticals, and yet shows low toxicity; thus Zygomycin $A_1$ is remarkably useful as a therapeutic. Thus, it is especially active against *Entamoeba histolytics* which is the pathogenic protozoa causing amoebic dysentery. This makes Zygomycin $A_1$ very useful in the therapy of such dysentery, and this utility is enhanced by the fact that Zygomycin $A_1$ is a water-soluble basic substance, so that its administration is facilitated. For the rest, the utilities of Zygomycin $A_1$ are generally the same as those of Zygomycin A and Zygomycin $A_2$. However, there is a difference which makes itself manifest during administration of these drugs and which spells the difference between practical utility and practical inutility. This difference is that while Zygomycin A and/or Zygomycin $A_2$ can not be administered by injection without producing such severe pain as effectively to exclude its use in practice, the administration of Zygomycin $A_1$ by injection is entirely free from pain. The result is that the present invention provides injectable medicine with enhanced antimicrobial activity relative to Zygomycin A and with freedom of pain on administration by injection.

The following non-limitative examples represent presently preferred embodiments of the invention.

Example 1

20 grams of Zygomycin A sulfate (corresponding to 14.32 grams of the free base) are dissolved in 600 milliliters of distilled water. The solution, after being adjusted to pH 9.0 with aqueous ammonia, is poured onto a column packed with 1.5 liters of Amberlite IRC-50 ($NH_4$-form). The column is then washed with about 6 liters of N/10 aqueous ammonia with a view to first removing impurities, after which about 5 to 6 liters of N/8 aqueous ammonia are poured onto the column to elute Zygomycin $A_2$. Thereafter, about 3 to 4 liters of N/5 aqueous ammonia is further poured onto the column to elute Zygomycin $A_1$. Each fraction is then concentrated under reduced pressure to evaporate off ammonia and the residue is then subjected to freeze-drying, white amorphous powder being obtained in each case.

A small portion of each of the so-obtained Zygomycin $A_1$ and Zygomycin $A_2$ is converted into its N-acetyl derivative by means of anhydrous acetic acid in methanolic solution. The respective N-acetyl derivatives are then subjected to paper chromatography to confirm their purity. The respective yields of Zygomycin $A_1$ and Zygomycin $A_2$ are 8.37 grams and 1.81 grams in this order, calculated as free bases.

Example 2

5 grams of Zygomycin A sulfate (corresponding to 3.58 grams of the free base) are dissolved in 20 milliliters of distilled water, and the resultant solution is poured onto a column (diameter 2.8 centimeters; height: 70 centimeters) packed with 400 cubic centimeters of Dowex 1 x 2 (OH-form, 50–100 mesh). The column is then washed with distilled water at the rate of 3.5 milliliters per minute, the eluate being collected as 50 milliliter fractions. Zygomycin $A_2$ is present in fractions 14 to 20, while Zygomycin $A_1$ is present in fractions 27 to 40. This can be confirmed by paper chromatography of the respective N-acetyl derivatives.

The several Zygomycin $A_1$-containing fractions are combined, and the several Zygomycin $A_2$-containing fractions are likewise combined. The respective combined fractions are then concentrated under reduced pressure and the so-obtained residues are severally freeze-dried. The yield of Zygomycin $A_1$ is 2.32 grams (calculated as the free base), and the yield of Zygomycin $A_2$ is 0.57 gram (calculated as the free base).

Respective structures of Zygomycin $A_1$ and Zygomycin $A_2$ are as follows:

Zygomycin $A_1$:

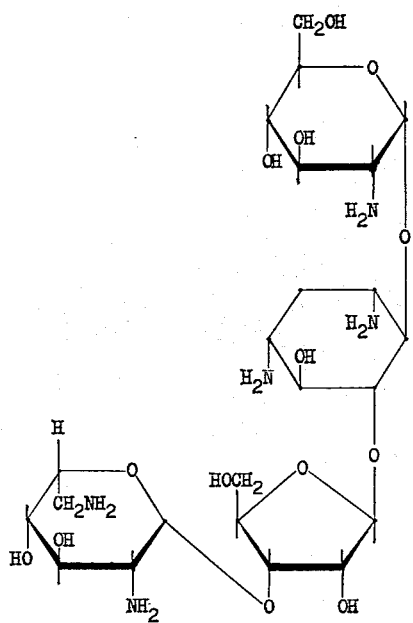

Zygomycin $A_2$:

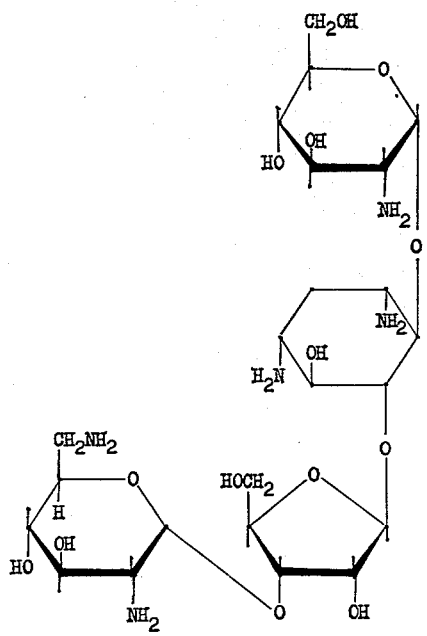

Having thus disclosed the invention, what is claimed is:

1. A method for separately recovering Zygomycin $A_1$ and Zygomycin $A_2$ from Zygomycin A which comprises dissolving the said Zygomycin A in water, passing the resultant solution through a chromatographic column consisting essentially of carboxylic acid-type ion exchange resin (base form), whereby the Zygomycin $A_1$ and Zygomycin $A_2$ are adsorbed onto the latter, then selectively eluting the Zygomycin $A_1$ and the Zygomycin $A_2$ by means of a cation-containing solvent selected from the group consisting of water and aqueous hydrophilic solvent, the eluting solvent for the Zygomycin $A_1$ having a different cation concentration than the eluting solvent for the Zygomycin $A_2$.

2. A method for separately recovering Zygomycin $A_1$ and Zygomycin $A_2$ from Zygomycin A which comprises dissolving the said Zygomycin A in water, passing the resultant solution through a chromatographic column consisting essentially of strong base anion exchange resin, whereby the Zygomycin $A_1$ and Zygomycin $A_2$ are adsorbed onto the latter, fractionally eluting the thus-adsorbed Zygomycin $A_1$ and Zygomycin $A_2$ by means of an eluting solvent selected from the group consisting of water and water containing hydrophilic organic solvent, and separately collecting the Zygomycin $A_1$-containing fractions from the Zygomycin $A_2$-containing fractions.

3. A method for separately recovering Zygomycin $A_1$ and Zygomycin $A_2$ from Zygomycin A which comprises dissolving the latter in water, adjusting the pH of the resultant solution to 9.0 with aqueous ammonia, pouring the so-adjusted solution onto a chromatographic column of cation exchange resin of carboxylic acid type, OH form, whereby Zygomycin $A_1$ and Zygomycin $A_2$ are adsorbed on the resin, pouring ⅛ N aqueous ammonia onto the resin and thereby selectively eluting Zygomycin $A_2$, thereafter pouring ⅕ N aqueous ammonia onto the resin and thereby eluting Zygomycin $A_1$, and collecting the respective eluates.

4. Zygomycin $A_1$, free from admixture with Zygomycin $A_2$, having the formula:

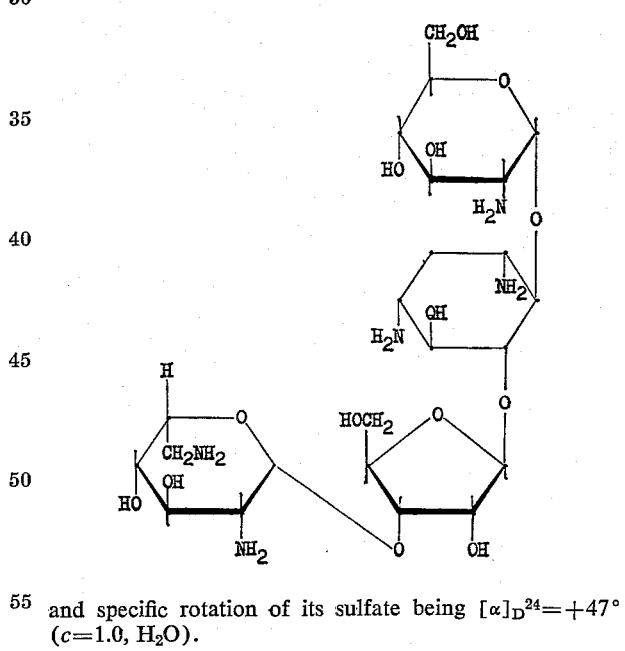

and specific rotation of its sulfate being $[\alpha]_D^{24} = +47°$ ($c = 1.0$, $H_2O$).

References Cited by the Examiner

UNITED STATES PATENTS

| | | | |
|---|---|---|---|
| 2,960,437 | 11/1960 | Friedman et al. | 260—210 |
| 3,089,827 | 5/1963 | Nakazawa et al. | 260—210 |

FOREIGN PATENTS 793,491  4/1958  Great Britain.

LEWIS GOTTS, *Primary Examiner.*

JOHNNIE R. BROWN, *Assistant Examiner.*